March 20, 1962     K. R. KENFIELD     3,025,869

FLUID PRESSURE VALVE MECHANISM

Filed July 7, 1959

INVENTOR

KENNETH R. KENFIELD

BY Scrivener & Parker

ATTORNEYS

United States Patent Office 3,025,869
Patented Mar. 20, 1962

3,025,869
FLUID PRESSURE VALVE MECHANISM
Kenneth R. Kenfield, Elyria, Ohio, assignor to Bendix-Westinghouse Automotive Air Brake Company, Elyria, Ohio, a corporation of Delaware
Filed July 7, 1959, Ser. No. 825,488
9 Claims. (Cl. 137—102)

This invention relates to fluid pressure valve mechanisms and more particularly to a valve device for controlling the flow of fluid under pressure and which functions in accordance with variations in the magnitude of the fluid pressure.

One of the objects of the present invention is to provide a novel fluid pressure valve which may be advantageously utilized in installations requiring the governing action which takes place at different control pressures.

Another object of the invention is to provide a simplified type of governor which is reliable in operation at selective cut in and cut out pressures and which includes relatively few parts.

Figure 1:
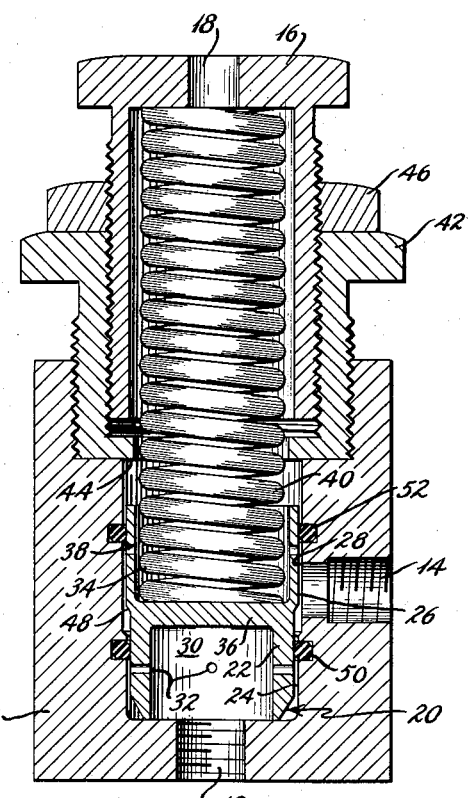
Figure 2:
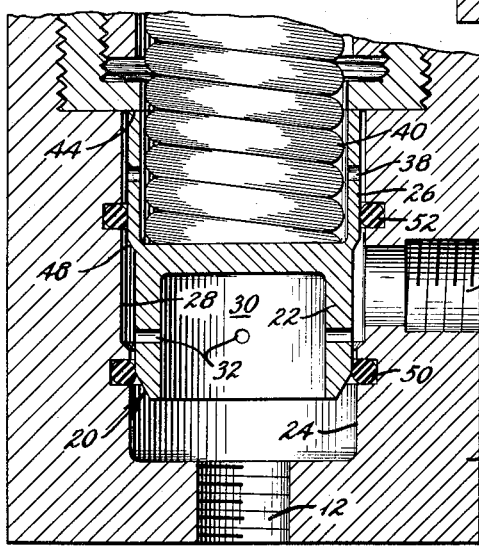

Other objects and their attendant advantages will become apparent as the following detailed description is read in conjunction with the accompanying drawings wherein:

FIG. 1 is a vertical cross-sectional view of a governor or valve constructed in accordance with the present invention; and FIG. 2 is an enlarged broken vertical cross-sectional view of the valve of FIG. 1 showing parts thereof in changed position.

Referring now to the drawings, the novel valve or governor of the invention includes a casing 10 having a reservoir or inlet connection 12, a control or outlet connection 14, and a cap 16 having an atmospheric connection 18. In cases where the valve is to be used as a governor for a compressor unloader, the connection 12 may be connected to a reservoir and the connection 14 may lead to a compressor unloading mechanism. The reservoir and unloader may be of any conventional form well known in the art and the valve of the invention may also be advantageously employed in connection with the control of a type of protection valve in an automotive air brake safety system of the general type shown, for example, in the patent to E. R. Fitch and T. J. Turek, No. 2,645,308, dated July 14, 1953 and, in such event, the present valve replaces the governor 124 of that patent. Other uses for the invention will be readily apparent from the description which follows.

In order to control the flow of fluid under pressure, which in the present instance is compressed air, the casing 10 houses a pressure responsive valve element 20, which includes a piston 22 slidable within a small bore 24 and a second piston 26 slidable within a larger bore 28. The piston 22 is provided with a central cavity 30, which is at all times exposed to the pressure at the inlet connection 12, and a plurality of radial ports 32 through the side wall of the piston which serve to connect the cavity 30 with the bore 24 when the valve element 20 is in the position of FIG. 1. The large piston 26 is likewise provided with a central cavity 34 which is separated from the cavity 30 by a wall 36. The cavity 34 is provided with a plurality of radial ports 38 which serve to connect the cavity 34 with the larger bore 28.

A regulating spring 40 interposed between the wall 36 and the cap member 16 determines the cut out and cut in pressures of the governor and these pressures may be adjusted by screwing the cap 16 into or out of a threaded sleeve 42 in the upper end of the casing 10. The sleeve 42 is provided at its lower end with an inwardly extending annular flange 44, which serves as an upper stop member for the valve member 20 as will become apparent hereinafter. When the cap member 16 has been properly adjusted, it may be locked in its selected position by means of a lock nut 46.

Referring again to the valve member 20, the pistons 22 and 26 are connected by a stepped portion 48 which resides at all times within the large bore 28. Adjacent the upper end of the small bore 24 is an O-ring 50, which is received in an annular cavity in the side wall of the bore 24 and adjacent the upper end of the large bore 28 is a second O-ring 52 which is also received in an annular cavity in the side wall of the bore 28. The O-rings 50, 52 extend inwardly into the bores 24, 28 so as to sealingly engage the exterior walls of the pistons 22, 26. The O-rings 50, 52 are so arranged that when the valve member 20 is in its normal position of FIG. 1, the ports 32, 38 are spaced below the respective O-rings 50, 52 so that the inlet port 12 is disconnected from the control port 14 by the O-ring 50 with the port 14 being connected to atmosphere by way of bore 28, ports 38, cavity 34, and atmospheric port 18.

In operation, assuming that the port 12 is connected to a fluid pressure reservoir and the control port 14 is connected to an unloader for a compressor supplying pressure to the reservoir, with the pressure in the reservoir below a predetermined value, the parts of the valve mechanism will occupy the position of FIG. 1. As the pressure in the reservoir increases, the reservoir pressure will build up through port 12 in the cavity 30 to exert an upward force on the piston member 22. As the pressure increases the valve member 20 will start to move upwardly so that the ports 38 in the large piston 26 are moved into registry with the O-ring 52 and simultaneously therewith or immediately thereafter the ports 32 in the smaller piston 22 are moved into registry with the O-ring 50. The ports 32, 38 should be so arranged with respect to each other and with respect to the O-rings 50, 52 that as the valve member 20 continues to move upwardly, the ports 38 are closed off so that the exhaust port 18 is disconnected from the large bore 28, before the ports 32 have moved above the O-ring 50 so as to connect the cavity 30 and hence the inlet port 12 with the large bore 28 and hence the control port 14. With this arrangement there is no possibility of ever directly connecting the inlet port 12 with the exhaust port 18.

As soon as the ports 32 have moved above the O-ring 50 so that the inlet and control ports 12, 14 are connected, the pressure at the inlet port acts on the increased area afforded by the shoulder 48 so that the valve member 20 moves upwardly with a snap action until the upper edge of the large piston 26 engages the radial flange 44 of the threaded sleeve 42 as shown in FIG. 2.

With the valve member 20 in this position, the inlet port 12 is connected with the control port 14 by way of the radial ports 32 and the control port 14 is disconnected from the atmospheric port 18 by reason of the fact that the radial ports 38 in the large piston member 26 have been moved above the O-ring 52. With reservoir pressure connected to the control port 14, the compressor is thereby unloaded and the valve member 20 remains in its up position of FIG. 2 until the reservoir pressure has fallen to a predetermined low value, at which point the spring 40 commences to expand and move the valve member 20 downwardly against the inlet pressure acting against the entire area defined by the large piston 26. As the valve member 20 continues to move downwardly, the ports 32 first register with and then move past the O-ring 50, thus disconnecting the control port 14 from the inlet port 12 and simultaneously therewith or immediately thereafter the ports 38 in the large piston 26 register with and then move below the O-rings 52 and as soon as this has occurred the control port 14 is connected by way of ports 38 with the atmospheric port 18, thus rapidly exhausting the fluid pressure from the control port 14 and the unloader so that the compressor again commences the delivery of fluid pressure to the reservoir. As soon as the control pressure is connected to atmosphere, the pressure acting on the area afforded by the shoulder 48 is removed and the valve member 20 moved to the position of FIG. 1 with a snap action.

It is contemplated that when the governor or valve mechanism of the present invention is used to control a compressor unloader, the valve member 20 will in most instances be continually moving towards one of its two positions and whenever the ports 32, 38 move from one side to the other of the O-rings 50, 52, the valve member 20 will thereafter continue to move in its original direction of motion except that the movement will then be with a snap action to the full limit of its range of movement, and very soon after the member 20 has moved to that particular limit it will commence moving slowly in the opposite direction as the reservoir pressure changes until the O-rings have again been crossed by the ports 32, 38 whereupon the member 20 will move with a snap action to its second limit of movement. Because of the relatively smaller area exposed to inlet pressure when the valve member 20 is in the down position of FIG. 1, a predetermined relatively high pressure is required to move the member 20 upward until the ports 32 are above the O-ring 52 and thereafter the increased area afforded by the shoulder 48 permits the pressure at the inlet port 12 to fall considerably below the initial pressure before the member 20 again moves downwardly to bring the ports 38 below the O-ring 52. Thus there is a substantial difference between the cut in and cut out pressures so that there is substantially no tendency for the governor to hunt and rapidly load and unload the compressor. The pressure at which the governor cuts in can be readily adjusted by screwing inwardly or outwardly on the cap member 16 as previously explained.

From the foregoing description it will be apparent that the present invention provides a governor or pressure operated valve mechanism which requires a relatively small number of parts yet is fully adjustable and reliable in operation. It will be apparent to those skilled in the art that the present invention is susceptible of a wide variety of modifications and changes without, however, departing from the scope of this invention as set forth in the appended claims.

What is claimed is:

1. Valve mechanism comprising a casing provided with a fluid pressure connection, a control connection and an atmospheric connection, fluid pressure valve means in said casing including a pair of rigidly connected pressure responsive members normally occupying a first position to establish communication between the control connection and the atmospheric connection and movable to a second position to interrupt said communication and establish communication between the control connection and the pressure connection, spring means normally maintaining said pressure responsive members in said first position, means for subjecting one of said members at all times to the pressure at said pressure connection, and means for subjecting the other member to the pressure of the fluid at the pressure connection only after movement of said members to establish communication between the control connection and the pressure connection, said valve means including a pair of separate resilient rings fixed in said casing on opposite sides of said control connection which cooperate with said pressure responsive members to control the connection between the control connection and said pressure and atmospheric connections as said members are moved between their first and second positions.

2. The fluid pressure valve of claim 1 wherein the pressure responsive members are of different effective areas.

3. The fluid pressure valve of claim 2 wherein the pressure responsive member having the smaller effective area is constantly subjected to the pressure of the fluid at the pressure connection.

4. Fluid pressure valve mechanism comprising a casing having inlet, control and atmospheric ports, a piston in said casing having an area exposed at all times to the pressure at said inlet port and a second piston integral with said first piston and having an area exposed at all times to the pressure at said control port, an O-ring in said casing between said inlet and control ports, a second O-ring in said casing between said control and atmospheric ports, said pistons normally occupying a position wherein said first O-ring sealingly engages the side of said first piston to interrupt communication between said inlet and control ports and wherein said second piston is out of sealing engagement with said second O-ring to establish communication between said control and atmospheric ports, said pistons being movable in response to a predetermined pressure at said inlet port to a second position wherein said second O-ring sealingly engages the side of said second piston to interrupt communication between said control and atmospheric ports and wherein said first piston is out of sealing engagement with said first O-ring to establish communication between said control and inlet ports.

5. The fluid pressure valve mechanism of claim 4 including spring means for normally maintaining said pistons in the first position.

6. The fluid pressure valve mechanism of claim 4 wherein the pistons and said O-rings are so arranged and constructed with respect to each other that both pistons sealingly engage their respective O-rings before either piston can move out of sealing engagement with its O-ring whereby the inlet port can never be directly connected with the atmospheric port.

7. The fluid pressure valve mechanism of claim 4 wherein the area of said second piston is greater than the area of said first piston.

8. The fluid pressure valve mechanism of claim 7 wherein means are provided for connecting the area of said second piston with said inlet port after said second piston is moved into sealing engagement with its O-ring and said first piston is moved out of sealing engagement with its O-ring, and vice versa, so that thereafter said pistons move to the limits of their movement with a snap action.

9. The fluid pressure valve mechanism according to claim 4 wherein the pistons are provided with internal cavities respectively exposed at all times to the pressures at said inlet and atmospheric ports, said cavities having side walls which at all times extend beyond and sealingly engage said O-rings, fluid passages through the said walls of said cavities so arranged as to be moved past said O-rings as said pistons are moved between their first and second positions so as to control the connections between said control port and said inlet and atmospheric ports.

References Cited in the file of this patent

UNITED STATES PATENTS

| | | |
|---|---|---|
| 2,488,949 | Walsh | Nov. 22, 1949 |
| 2,621,885 | Schmitt | Dec. 16, 1952 |
| 2,672,881 | Jay | Mar. 23, 1954 |
| 2,706,487 | Wilson | Apr. 19, 1955 |
| 2,875,978 | Kmiecik | Mar. 3, 1959 |